INVENTOR.
Herbert E. Matthes
BY Robert M. Dunning
ATTORNEY

Patented June 1, 1954

2,679,708

UNITED STATES PATENT OFFICE 2,679,708

FISHHOOK

Herbert E. Matthes, St. Paul, Minn.

Application May 26, 1950, Serial No. 164,348

1 Claim. (Cl. 43—44.8)

My invention relates to an improvement in fish hook and deals particularly with a type of hooking having a spring guard forming a part thereof.

An object of the present invention lies in the provision of a fish hook which is provided with a spring guard which extends across the hook opening. This spring guard is capable of serving a plurality of purposes. For example the guard holds bait in place upon the hook. Furthermore, the guard engages the mouth of a fish biting the hook and prevents the escape thereof.

A feature of the present invention lies in the provision of a guarded hook which may be manufactured with relative ease. Fish hooks having resilient guards have previously been patented. However, few, if any, of this type of hook have been produced because of the manufacturing difficulties involved in producing the construction. My hook may be manufactured at relatively low cost without requiring special or unusual machinery.

A feature of the present invention lies in the provision of a hook having a resilient guard forming a part thereof and employing an off-set lock structure which holds the guard normally in substantially parallel relation to the shank of the hook. A portion of the guard normally extends along one side of the hook shank and is provided with a bent end which normally bridges the open point of the hook. The off-set shoulder or lock is bent to engage against the opposite side of the hook shank so as to normally hold the guard in closely adjacent relation to the plane of the hook shank.

A feature of the present invention lies in the fact that the shoulder for holding the guard near the plane of the hook functions to accomplish its purpose even while the guard is flexed to partially bridge the hook. When a fish bites the hook the guard is flexed out of parallel relation with the shank of the hook. However, my shoulder holds the guard is such a way that it normally moves only in a plane substantially parallel to the plane of the hook. At the same time, the shoulder holds the guard from movement above side by side relation to the hook shank.

An added feature of the present invention lies in the fact that the shoulder on the guard may serve to hold the guard flexed away from the hook to simplify the baiting of the hook and removing a fish therefrom. My shoulder is so arranged that if the guard is flexed beyond a predetermined maximum the shoulder may engage against the hook to hold the guard in an open position.

These and other objects and novel features of my invention will be more clearly and fully set forth in the following specification and claim.

In the drawings forming a part of my specification:

The fish hook is indicated in general by the letter A. The hook A includes an elongated shank 10 which is bent at 11 to provide a hook end or bill which terminates in a reversely turned extremity 12. The extremity 12 is pointed. The hook end 12 may be provided with a barb, but as the construction illustrated does not require the use of the barb, a barbless point is preferred.

Figure 1:
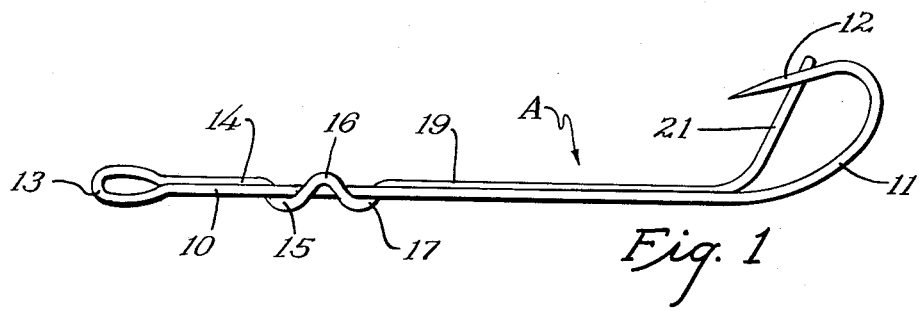
Figure 1 is a perspective view of my hook showing the arrangement of parts therein.
Figure 2:
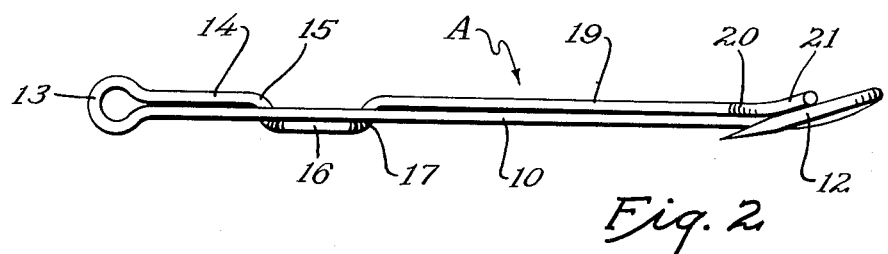
Figure 2 is a top plan view of the hook showing the relationship of parts when the hook is closed.

As illustrated in Figure 2 of the drawings, the extremity 12 of the hook is often bent somewhat out of a vertical plane through the hook shank as viewed in Figure 2 of the drawings. The turning of the hook point at somewhat of an angle increases the effectiveness of the hook. In speaking of "the plane of the hook," the applicant refers to the plane which would extend through the hook and point if the hook were aligned with the shank 10. Actually there is no single plane which extends through the axis of the hook wire throughout its length.

The shank 10 is connected by a resilient loop 13 to a guard shank 14. The guard shank 14 extends parallel to the hook shank 10 as illustrated in Figure 2 and is in side by side relation thereto. Normally the guard shank portion 14 is on a plane horizontally through the straight portion of the hook shank 10 and the loop 13.

The guard shank is off-set downwardly around the under-surface of the hook shank at 15 to emerge on the opposite side of the hook shank. The off-set 15 continues into an upwardly directed shoulder 16 which forms a shoulder engaging against the side of the hook shank opposite that against which the guard shank portion 14 rests. The shoulder 16 is connected by an offset 17 which extends downwardly and under the shank of the hook to join the shank portion 19 which is substantially aligned with the shank portion 14.

Near the rounded end 11 of the hook, the guard shank 19 is bent upwardly at 20 to form a guard end 21. This guard end 21 bridges the hook and lies against the side of the hook when the guard is in normal position.

Figure 3:
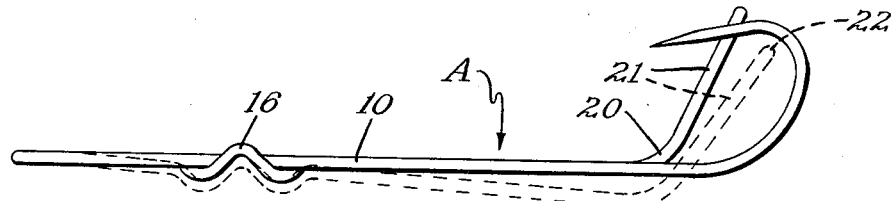
Figure 3 is a side elevation view of the hook showing the hook in full lines in closed position and showing the manner in which the guard may flex when taken by a fish.

The shanks of the guard, as well as the loop 13, are flexible and resilient and this guard may flex downwardly when a fish bites at the hook. Under pressure the guard 21 will flex downwardly as indicated in dotted outline in Figure 3 of the drawings and this flexing motion may continue until the extremity 22 of the guard is free of the hook. In other words, the bent end 21 of the guard is held against the side of the hook as long as this bent end is in contact with the hook. During all of this time the shoulder 16 remains engaged with the hook shank 10.

Figure 4:
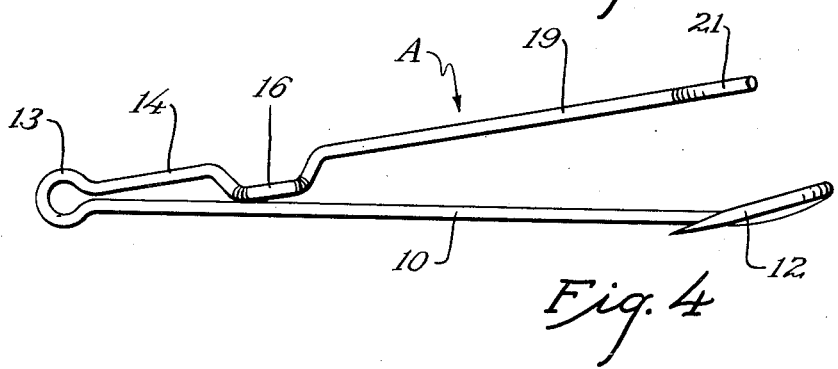
Figure 4 is a view similar to Figure 2 showing the guard in open position away from the hook end of the hook.

In Figure 4 of the drawings I disclose the position of the guard when it is desired to bait the hook or to remove a fish therefrom. It will be noted that in this position the shoulder 16 engages the opposite side of the hook shank 10 and the shank portions 14 and 19 as well as the bent end 21 are held in spaced relation to the hook end 12 of the hook A. The guard is flexed into this position by flexing the guard downwardly from the position shown in full lines in Figure 3 until the shoulder 16 is beneath the level of the hook shank 10. At this point the guard may be flexed laterally into the position shown in Figure 4. By releasing the guard it springs upwardly so that the shoulder 16 engages against the opposite side of the hook shank from that which it usually engages.

It will be noted that if the shoulder 16 is at a substantial distance from the hook loop 13, the shank of the guard cannot readily flex laterally until the shoulder 16 is disengaged from the shank 10. In order to flex laterally, the shank portion 19 would have to flex as the shoulder 16 holds the guard from lateral movement in one direction, while the side by side relation of the guard and hook prevents lateral movement in the other direction. At the same time, however, the entire length of the guard may flex downwardly as flexing movement is not impeded in this direction. As a result the weight of the guard may be reduced and the hook and guard may be formed of lighter material than would otherwise be necessary. The off-set portion of the hook engages the hook shank between its ends and reinforces it from bending, thus permitting lighter wire to be used for the hook.

As soon as the guard is flexed downwardly a distance sufficient to permit the shoulder 16 to clear the hook shank 10 the entire length of the guard may flex so that the guard may be readily sprung into the position shown in Figure 4.

In accordance with the patent statutes, I have described the principles of construction and operation of my fish hook, and while I have endeavored to set forth the best embodiments thereof, I desire to have it understood that obvious changes may be made within the scope of the following claim without departing from the spirit of my invention.

I claim:

A hook of the class described comprising a hook shank having a curved bill including a pointed end, and a guard shank flexibly connected to the end of the hook shank opposite the pointed end thereof permitting relative movement of the shanks, said guard shank extending along the hook shank and having an inclined end portion normally bridging the curved bill on said hook shank, and one of said shanks having a locking shoulder formed thereon intermediate the ends thereof, said shoulder in one position embracing a portion of the other shank to hold said shanks in side by side relation and in another position extending between portions of said shanks to hold said shanks in diverging relation.

References Cited in the file of this patent

UNITED STATES PATENTS

| Number | Name | Date |
|---|---|---|
| 675,853 | Edgar | June 4, 1901 |
| 814,624 | Robinson | Mar. 6, 1906 |
| 1,461,617 | Hill | July 10, 1923 |
| 2,449,045 | Athans | Sept. 14, 1948 |

FOREIGN PATENTS

| Number | Country | Date |
|---|---|---|
| 71,857 | Norway | Mar. 24, 1947 |